United States Patent [19]
Sheldon et al.

[11] Patent Number: 5,462,511
[45] Date of Patent: Oct. 31, 1995

[54] TOOL CHANGER CONFIGURED FOR USE WITH MACHINE TOOLS

[75] Inventors: Paul C. Sheldon, Mequon; Richard J. Loerch, Greenfield, both of Wis.

[73] Assignee: Giddings & Lewis, Inc., Fond du Lac, Wis.

[21] Appl. No.: 275,236

[22] Filed: Jul. 14, 1994

[51] Int. Cl.$^6$ .................................................... B23Q 3/157
[52] U.S. Cl. .................................. 483/1; 414/738; 483/38
[58] Field of Search .................................. 483/50, 38, 39, 483/42, 43, 47, 27, 49, 48, 1; 74/519; 414/738

[56] References Cited

U.S. PATENT DOCUMENTS

| | | |
|---|---|---|
| 699,732 | 5/1902 | Williams . |
| 3,097,750 | 7/1963 | Stummer . |
| 3,633,764 | 1/1972 | Nordmann et al. ............... 483/49 |
| 3,678,572 | 7/1972 | Mello ........................... 483/50 X |
| 4,297,908 | 11/1981 | Zimmer . |
| 4,557,035 | 12/1985 | Rütschle et al. ............... 403/47 |
| 4,700,452 | 10/1987 | Babel . |
| 4,837,919 | 6/1989 | Hoppe ........................... 483/38 |
| 5,107,582 | 4/1992 | Kessler . |

FOREIGN PATENT DOCUMENTS

| | | | |
|---|---|---|---|
| 2648378 | 12/1990 | France ........................... 483/50 |
| 155240 | 5/1982 | German Dem. Rep. ........... 483/38 |
| 3440604 | 5/1986 | Germany ........................ 483/50 |
| 44243 | 3/1985 | Japan ............................. 483/38 |
| 58446 | 3/1989 | Japan ............................. 483/38 |

*Primary Examiner*—William Briggs
*Attorney, Agent, or Firm*—Foley & Lardner

[57] ABSTRACT

The present invention is directed to an apparatus and method for moving tools between a storage structure and a machine tool. The apparatus includes a framework on which is mounted a linkage assembly comprising a plurality of individual links pivotably interconnected. A tool holder is attached to one link and is configured to select tools from the storage structure and move them into proximity with the machine tool. The apparatus also removes the tool from the machine tool and returns it to the storage structure. The linkage assembly provides for efficient movement of the tool holder along a complex curvilinear path by pivoting a single link or element of the linkage assembly.

20 Claims, 4 Drawing Sheets

TOOL CHANGER CONFIGURED FOR USE WITH MACHINE TOOLS

FIELD OF THE INVENTION

The present invention relates generally to an apparatus for moving an object between two points in space and, more particularly, to a tool changing device for moving a tool along an efficient path from a storage structure into proximity with a machine tool.

BACKGROUND OF THE INVENTION

Machine tools are used for a variety of cutting operations, including milling, drilling, boring and finishing. Typically, they are placed in factories or similar settings, where each machine tool repeatedly performs designated operations. Consequently, the actual cutting device or tool must be replaced relatively often as it becomes dull or worn. Also, because some machine tools are used for a variety of related cutting operations, different cutting tools must be substituted for each operation in a manufacturing series or sequence.

An object or tool storage structure is often located near the machine tool to store a plurality of cutting tools. For example, the storage structure can be used to store sharp tools for replacing tools that become dull or to store a variety of tool types for different cutting operations. The storage structure can also be used to store the cutting tools after removal from the machine tool. Thus, cutting tools are moved back and forth between the storage structure and the machine tool on a regular basis.

One problem which develops with this regular changing of cutting devices is a decrease in efficiency of operation. Each time a cutting tool is changed, the machine tool is out of operational service. If these periods of machine tool "down time" can be shortened, the overall productivity of the particular cutting operation increases.

Cutting devices used by machine tools are interchanged in a variety of ways, including changes by hand and changes by some type of mechanical tool changer. Changing cutting tools by hand is inefficient because it requires a human operator to perform the tool change, and often considerable time is required to manually manipulate the components. More commonly, mechanical tool changers are used, but these tool changers present additional problems. For example, many existing devices are complicated and this complexity makes the devices subject to breakdown. This, in turn, leads to great inefficiencies of production because the tools cannot be changed during the breakdown.

Due to the orientations of the typical storage structure relative to the machine tool and the workpiece undergoing operations by the machine tool, removal and replacement of the cutting tool often requires the tool be moved along a relatively complex or winding path to and through the machine. For example, the cutting tool may be oriented in one direction in the storage structure and in a different direction when loaded in the machine tool. The mechanical tool changer must therefore grasp the cutting tool in the storage structure, remove it, move it towards the machine tool without hitting any obstructions, change the axial orientation of the tool, and then move it into close enough proximity with the spindle of the machine tool so it may be loaded into the spindle. A similar but reverse path is required for unloading a cutting tool and moving it to the storage structure.

Conventional tool changers move the cutting tool between the machine and storage in a series of steps, and each step typically requires a separate mechanism. These conventional tool changers have a variety of slides and pivoting or rotating components for moving the cutting tool along the X axis, Y axis, or Z axis, or for pivoting the cutting tool along simple, single radius arcs. Each of the components is designed to move the tool through a single, simple motion. By sequentially moving the cutting tool in straight line steps and curved steps of precalculated lengths, the tool can be moved back and forth between the storage structure and the machine tool without hitting any obstructions.

One problem with these devices is the mechanical complexity required to provide motion along a plurality of axes or simple curves. Typically, a separate driving device is required for each different step or different type of motion. It would be advantageous if the cutting tool could be moved in a single motion between the storage structure and the machine tool without interference. Current tool changers are either not capable of moving the tool in this manner, since the path of movement often tends to be a complex path, or, if capable, the tool changers require a complex arrangement of individual components generally each having only one degree of freedom. These complex arrangements, however, are expensive and unreliable.

Some mechanical tool changers incorporate a pair of arms which either pivot or extend to move a tool from a storage location to a machine tool spindle. Generally, such arms are capable of moving a tool through a relatively simple curved path. Some adjustment of the path can be accomplished by adjusting the arm lengths and pivot points. However, these systems remain relatively complex since they require individual driving or actuating mechanisms connected to each movable arm. Each actuating mechanism must remain in proper functioning order to move the tool through the various steps and into proper position. Additionally, the limited range of motion provided by pairs of arms often requires additional vertical or horizontal movement of the work table or framework to which the arms are mounted.

Certain other devices have incorporated multiple link articulating linkages to move objects from one position to another. However, such devices have proven to be unsatisfactory for many operations such as tool changes that require movement of the tool along a relatively complex, often curvilinear path.

The present invention addresses the drawbacks of current tool changing devices.

SUMMARY OF THE INVENTION

The present invention features a system and method for moving an object through space along a spatially complex path. The system includes an object changer mechanism having a linkage assembly pivotably mounted on a rigid framework. The linkage assembly includes a plurality of pivotably interconnected links. An object holder is mounted on an object transfer link of the plurality of interconnected links. Additionally, an actuator is connected to an actuator link of the plurality of interconnected links. The actuator is configured to move the actuator link which causes the linkage assembly to move the object holder along the spatially complex path.

According to another aspect of the invention, the system includes a storage structure configured to hold a plurality of the objects. Additionally, the system includes a machine configured to receive and use the objects transferred by the tool changer mechanism.

According to more particular aspects of the invention, the object changer mechanism is a tool changer comprising a rigid framework to which is mounted a plurality of pivotable links. For example, in a preferred embodiment, a first link is pivotably connected to the framework at a first connection point. A second link is pivotably connected to the first link at a second connection point. This second link includes a tool holder configured to hold or grip the tool, typically a tool for use with a machine tool. A third link is pivotably connected to the second link at a third connection point disposed intermediate the second connection point and the object holder. The third link is also pivotably connected to the framework at a fourth connection point.

An actuator assembly is preferably connected to the first link to pivot it about the first connection point. The pivoting of the first link moves the object holder along the efficient and spatially complex path. In this manner, an object such as a tool can be transferred between a storage structure and a machine tool in a smooth, continuous movement for loading and unloading the tool.

BRIEF DESCRIPTION OF THE DRAWINGS

The invention will hereafter be described with reference to the accompanying drawings, wherein like referenced numerals denote like elements, and.

DETAILED DESCRIPTION OF THE PREFERRED EMBODIMENT

Figure 1:
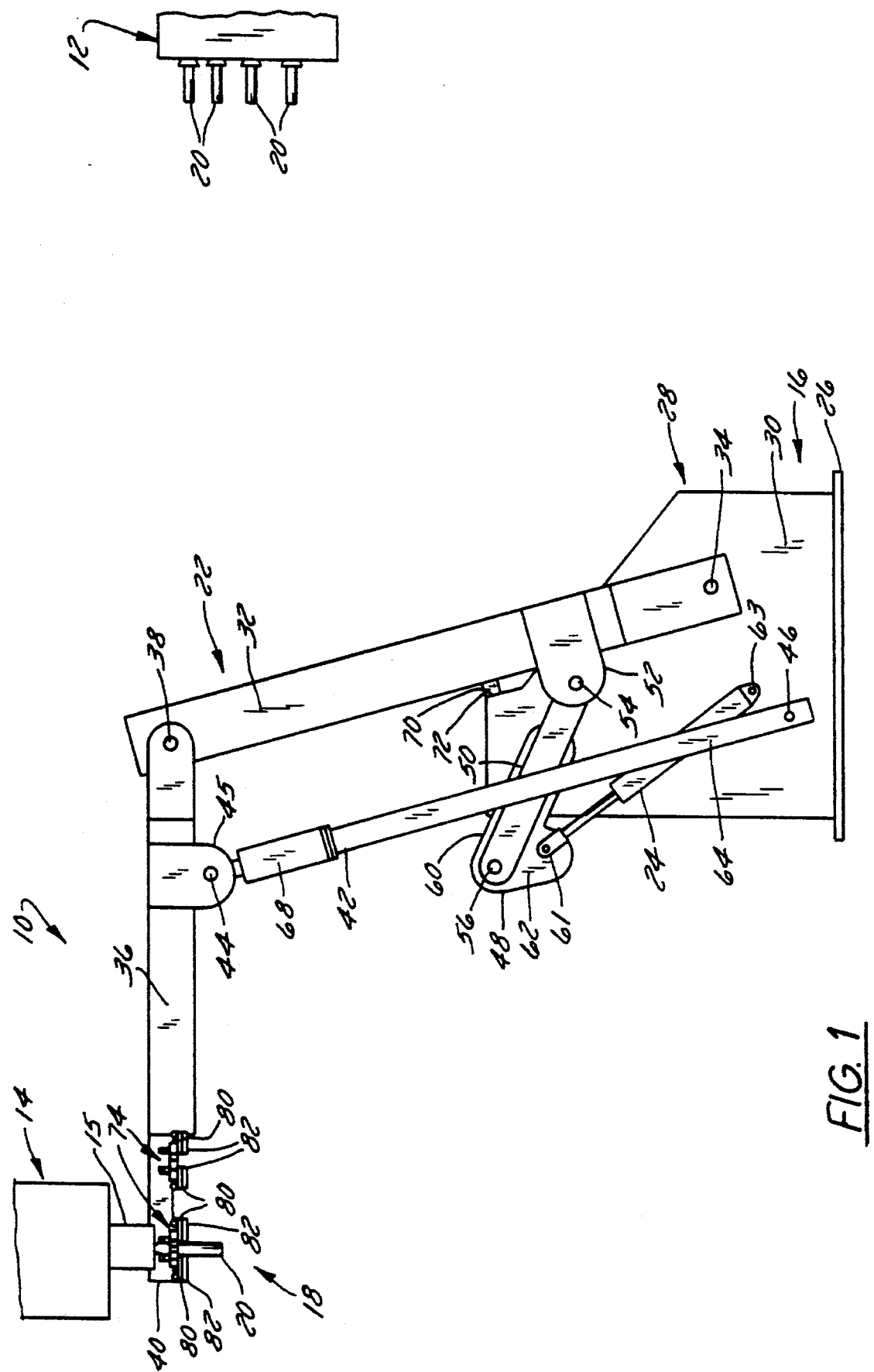
FIG. 1 is a side elevational view of an apparatus for moving an object through space according to a preferred form of the present invention, the apparatus being in a position extended towards the machine.

FIGS. 1–4 illustrate an apparatus 10 for moving objects, such as cutting tools, between a first location and a second location, here a storage structure 12 and a machine tool 14 having a spindle 15. The preferred embodiment of apparatus 10 will be discussed with reference to moving cutting tools from a storage structure to a machine tool and vice versa. However, other uses and configurations of apparatus 10 are also within the scope of the present invention. For example, apparatus 10 could be used to move workpieces between locations or to deliver or remove components or other objects from a variety of machines and equipment.

In the preferred embodiment, apparatus 10 includes a framework 16, an object holder such as tool holder 18 for holding an object such as tool 20, a linkage assembly 22 comprised of a plurality of links, and an actuator mechanism 24. Actuator mechanism 24 is preferably attached to one of the links in linkage assembly 22 to impart motion to that link, thereby causing movement of both the linkage assembly 22 and the tool holder 18.

Linkage assembly 22 is designed or mechanically programmed to move tool 20 along a particular path between storage structure 12 and machine tool 14. By interconnecting the links of linkage assembly 22 and framework 16 at appropriate pivotal connection points, tool holder 18 and tool 20 can be rapidly moved along a complex, often curvilinear path (i.e. a path having curves of multiple and different radii). This complex and rapid movement can be accomplished by actuating or moving a single link in linkage assembly 22. There is no need to provide each slide or link with a separate driving mechanism to move the tool 20 through a series of separate steps. The simple arrangement of the preferred embodiment also avoids separate calibration of numerous independently movable slides and links.

Framework 16 includes a base portion 26 and an upper support portion 28 mounted on base portion 26. Upper support portion 28 preferably comprises at least one planar wall 30, and it can be configured to include two planar walls connected together and disposed on generally opposite sides of actuator mechanism 24.

Linkage assembly 22 can be constructed in a variety of configurations depending on the specific application and the specific path over which tool holder 18 is moved. Basically, linkage assembly 22 includes a plurality of interconnected links mounted to framework 16. The number and length of the links, as well as the points of interconnection, vary depending on the desired path of tool holder 18. Additionally, the various links can be pivotably mounted to framework 16 and to each other in a variety of ways, including pins mounted in bearings.

In a preferred embodiment, a base link 32 is pivotably mounted to framework 16 at a base connection point 34. Base link 32 is pivotably connected to a tool transfer link 36 at a second base connection point 38 disposed at a spaced distance from base connection point 34. Tool transfer link 36 includes an object holder end 40 configured to receive tool holder 18. A guide link 42 is pivotably connected to tool transfer link 36 at a connection point 44 disposed between tool holder end 40 and second base connection point 38. In the illustrated embodiment, link 42 is pivotably mounted between a pair of flanges 45 extending from tool transfer link 36. Guide link 42 is also pivotably connected to framework 16 at a second support link connection point 46.

Actuator mechanism 24 is connected to base link 32 via an actuator link 48 and a connector link 50. Connector link 50 is preferably pivotably connected to base link 32 generally intermediate base connection point 34 and second base connection point 38. In the preferred embodiment, a pair of flanges 52 extend from base link 32, and connector link 50 is pivotably connected therebetween at a connection point 54. Connector link 50 is also pivotably connected to actuator link 48 at a connection point 56. Actuator link 48 is further pivotably connected to framework 16 at an actuator link connection point 58.

The various links may have a variety of configurations, lengths, and shapes. However, in the preferred embodiment, actuator link 48 includes a leg 60 extending between connection points 56 and 58, and a second leg 62 extending generally transverse to leg 60 in general proximity to connection point 56. Actuator mechanism 24 has a first end 61 pivotably connected to second leg 62 at a location offset from a line extending between connection points 56 and 58. Actuator mechanism 24 also has a second end 63 that is preferably pivotably mounted to upper support portion 28 of framework 16.

Actuator mechanism 24 may be extended and retracted to pivot actuator link 48 about actuator link connection point 58. For example, if the apparatus 10 is extended towards machine 14 as illustrated in FIG. 1, actuator 24 will first extend and pivot actuator link 48 in a clockwise direction until actuator 24 reaches its fully extended position. The momentum of the apparatus carries actuator 24 and linkage assembly 22 past this position so actuator 24 can begin to retract and continue moving link 48 in a clockwise direction until apparatus 10 is generally in the position illustrated in FIG. 3. However, actuator mechanism 24 could have a variety of configurations, such as a motor connected to a gear or pulley mounted to actuator link 48 about actuator link connection point 58.

Guide link 42, on the other hand, is generally U-shaped, having a pair of legs 64 which extend to second support link connection point 46. Legs 64 are connected by a cross member 66. In the illustrated embodiment, guide link 42 is an extensible link and includes an extendable portion 68 connected between cross member 66 and tool transfer link 36 at connection point 44. Extendable portion 68 is preferably a fluid cylinder, such as a hydraulic cylinder. (Both actuator mechanism 24 and extendable portion 68 are preferably fluid pressure cylinders, such as hydraulic cylinders supplied with hydraulic fluid from a pressure source, such as a pump (not shown). Additionally, a stop 70 is attached to base link 32 and abuts a stop surface 72 disposed on framework 16 when apparatus 10 is extended towards machine tool 14, as shown in FIG. 1.

Figure 2:
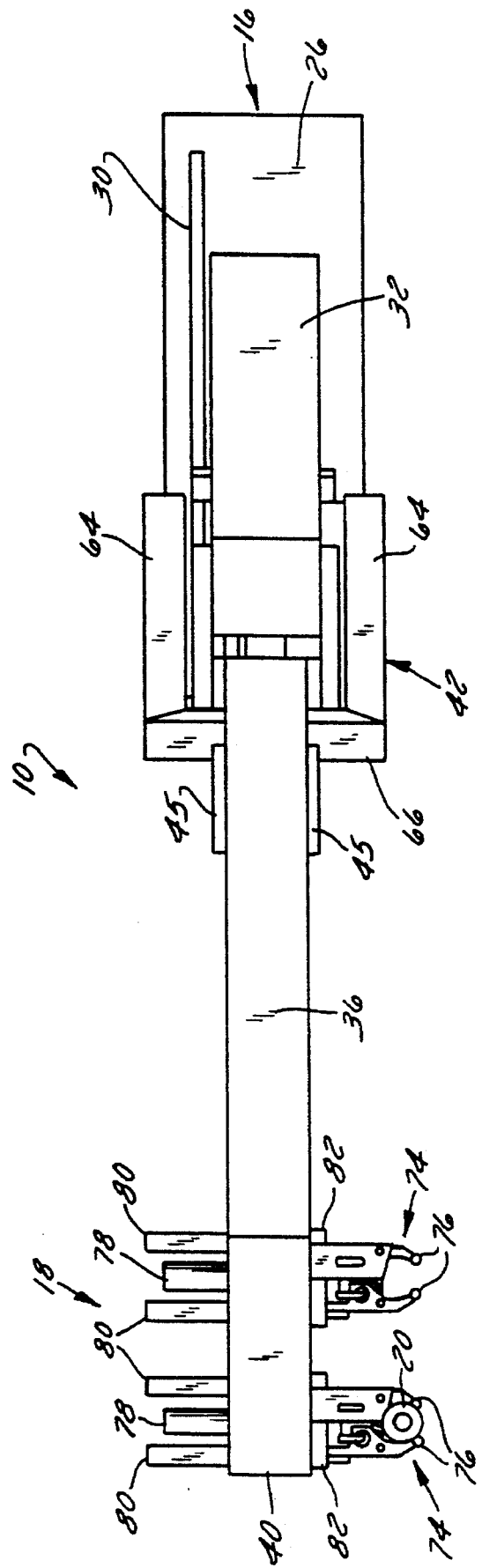
FIG. 2 is a top plan view of the apparatus shown in FIG. 1.
Figure 3:
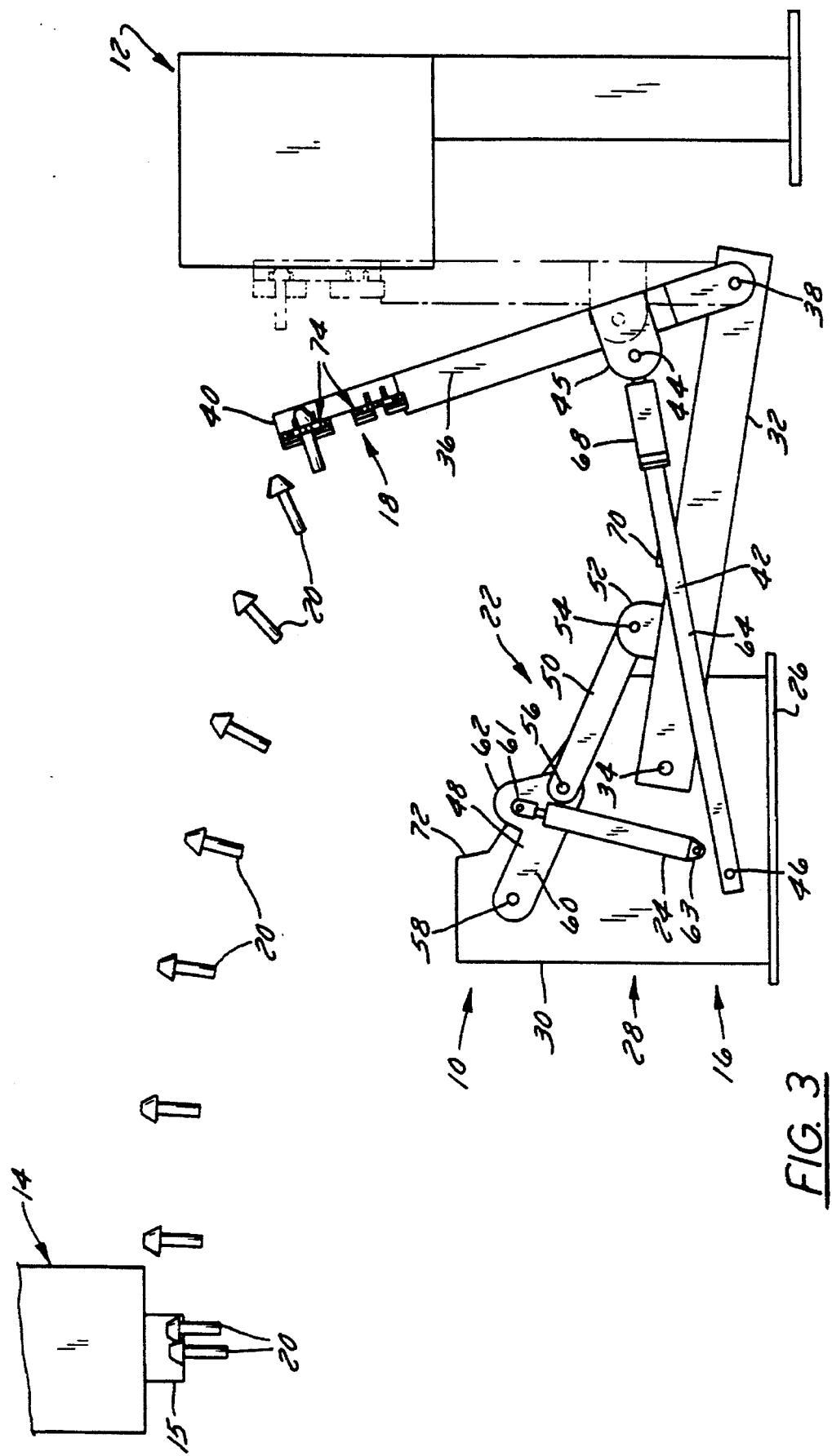
FIG. 3 is a side elevational view of the apparatus showing the linkage and tool holder in a position extended towards the storage structure.
Figure 4:
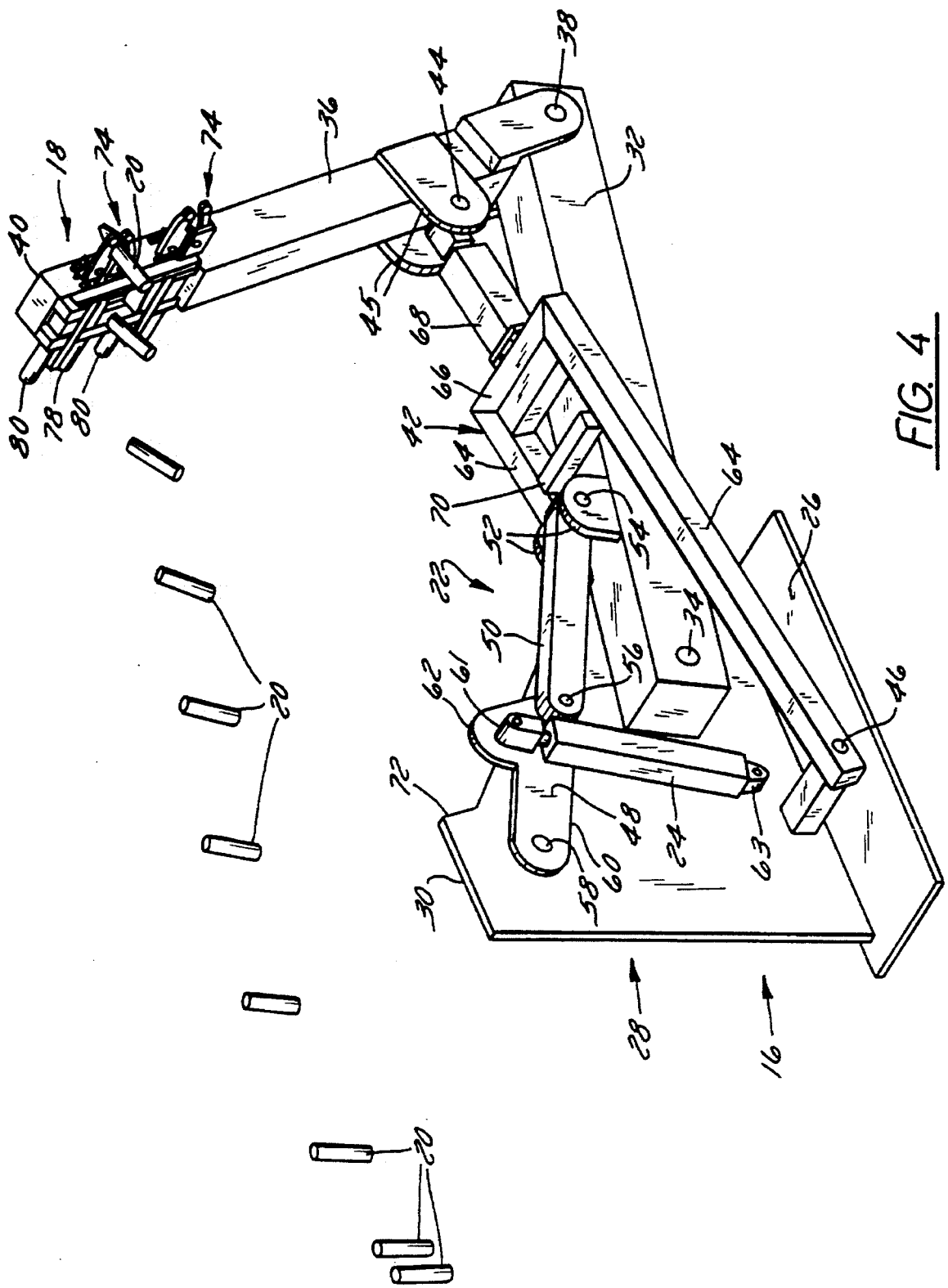
FIG. 4 is a perspective view showing the linkage and tool holder in a position extended towards the storage structure.

As illustrated best in FIG. 2, tool holder 18 preferably includes a pair of tool grips 74 attached to tool holder end 40. Tool holder 18 may have a variety of configurations depending on the particular application, including one tool gripping device or multiple tool gripping devices. However, it is often advantageous to use a pair of gripping devices 74 so the used tool can be retrieved and the new tool placed in proximity to spindle 15 of machine tool 14 during the same operation. In the illustrated embodiment, each gripping device 74 includes a pair of spring loaded pincher fingers 76 configured to grip the tool 20. Preferably, each gripping device 74 includes a fluid pressure cylinder 78 connected to the pincher fingers to extend and retract the pincher fingers 76 in a direction generally transverse to tool transfer link 36. Cylinders 78 can be connected to the pressure source as with actuator 24 and extendable portion 68. The pincher fingers 76 are connected to a pair of linear guides 80 which slide through guideways 82. This configuration helps guide the pincher fingers 76 as pneumatic cylinder 78 forces them back and forth. Thus, as tool holder 18 is moved into proximity with either tool storage structure 12 or machine tool 14, the gripping devices 74 may be transversely extended to more readily grip the tool 20.

The type of gripping devices 74 can, of course, be changed or adapted depending on the type of tool or device being moved by apparatus 10. For instance, machine tool 14 may be a conventional machine tool, such as a boring, milling, or grinding machine having spindle 15 configured to grasp generally circular or conical tool shanks. However, machine 14 could also be configured to hold devices, such as probes, sensors, lasers, welding devices, and a variety of other devices. In such situations, tool holder 18 would be reconfigured to grip or hold the appropriate tool. Similarly, storage structure 12 can be designed in a variety of ways depending on the type of tool being stored. For example, tools may be arranged in circular patterns or linear patterns with various members exposed for cooperation with tool holder 18.

In operation, actuator mechanism 24 pivots actuator link 48 counter-clockwise about actuator link connection point 58 until the tool transfer link 36 is extended towards machine tool 14. After the new tool 20 is loaded in machine tool 14, actuator mechanism 24 extends and retracts as described above and forces second leg 62 of actuator link 48 in a clockwise direction about actuator link connection point 58. As actuator link 48 pivots, connector link 50 forces base link 32 to also pivot generally clockwise about base connection point 34. Meanwhile, guide link 42 is forced to pivot in a clockwise direction about second support link connection point 46. Link 42, in cooperation with base link 32, moves tool transfer link 36 and tool holder 18 towards storage structure 12 until apparatus 10 is generally in the position illustrated in FIGS. 3 and 4. At this point, extendable portion 68 can be extended to further pivot tool transfer link 36 about second base connection point 38 to move gripping devices 74 into alignment with tool storage structure 12.

Although extendable portion 68 is not necessary for all applications, it is sometimes desirable to align tool holder 18 with the appropriate tool 20 at a slower speed than the speed incurred by tool holder 18 during the potentially rapid movement of linkage assembly 22 and particularly tool transfer link 36. Thus, by pivoting a single link, e.g. actuator link 48, tool holder 18 is moved along an efficient, complex, curvilinear path that potentially includes a change in orientation of the tool holder 18 and its attached tool 20. The movement is a single movement requiring only a single actuating mechanism 24.

Once it is determined what type of path is required for an efficient tool change operation between storage structure 12 and machine tool 14, the linkage assembly can be mechanically programmed by selecting appropriate links and pivot points. The lengths of the various links and the locations of the various connection points can be determined in a variety of ways. For example, well known principles of geometry can be used to calculate the interaction of the links, including the required lengths and pivot points, for producing the desired path.

Additionally, computer programs can be used to perform the geometry required for construction of a specific linkage assembly 22 capable of moving tool holder 18 along the desired predetermined path. For example, commercially available software such as Catia, Version 3, from Dassault Systems could be used for the geometric design and MICRO-MECH™ from MechTech Solutions, Inc. could be used for analysis of the mechanism forces, accelerations, and velocities.

It will be understood that the foregoing description is of a preferred exemplary embodiment of this invention and that the invention is not limited to the specific forms shown. For example, different tool holders and storage structures may be used; various materials may be used to construct the framework and linkage assembly; the framework may be designed in a wide variety of configurations depending on the particular application of this invention; and the connection points, link lengths, and mounting of the linkage assembly may be modified and adjusted for each particular situation. These and other modifications may be made in the design and arrangement of the elements without departing from the scope of the invention as expressed in the appended claims.

What is claimed is:

1. A system for moving a tool through space along a spatially complex path, comprising:

a storage structure configured to hold a plurality of tools;

a machine tool configured to receive and hold the tool; and a tool changer mechanism having:
 a rigid framework;
 a linkage assembly pivotably mounted on the rigid framework, the linkage assembly including a plurality of pivotably interconnected links, the pluralpivotably interconnected links being pivotably connected to the rigid framework in at least three places;

a tool holder mounted on a tool transfer link of the plurality of interconnected links; and an actuator connected to an actuator link of the plurality of interconnected links, wherein movement of the actuator link causes the linkage assembly to move the tool holder along the spatially complex path.

2. The system of claim 1, wherein the plurality of pivotably interconnected links includes an extensible link.

3. The system of claim 2, wherein the extensible link includes a fluid cylinder actuable to adjust the position of the tool holder.

4. The system of claim 1, wherein the linkage assembly includes at least two links pivotably connected to the framework.

5. The system of claim 1, wherein the linkage assembly includes at least three links pivotably connected to the framework.

6. The system of claim 4, wherein the actuator is a fluid pressure cylinder connected between the framework and the actuator link.

7. The system of claim 1, wherein the tool holder includes a pair of grippers capable of gripping tools.

8. A system for loading a cutting tool into a machine tool, the system comprising:

a machine tool;

a tool storage structure configured to hold a plurality of tools; and a tool changer configured to move the tool back and forth between the tool storage structure and the machine tool, the tool changer including:

a framework;

a plurality of links pivotably interconnected at a plurality of connection points, the plurality of links further being pivotably connected to the framework by at least three pivot points, the plurality of links including a tool transfer link having a tool holder configured to hold the tool; and an actuator connected to the plurality of links to input motion to the plurality of links, wherein the plurality of links and framework are structurally interconnected so the actuator will move the tool holder between the tool storage structure and the machine tool in a single motion.

9. The system of claim 8 for loading a tool into a machine tool, wherein the plurality of links includes:

a first link;

the tool transfer link pivotably connected to the first link at a first connection point; and a third link pivotably connected to the tool transfer link at a second connection point.

10. The system of claim 9 for loading a tool into a machine tool, wherein the first link is pivotably connected to the framework at a first pivot point separate from the first connection point.

11. The system of claim 10 for loading a tool into a machine tool, wherein the third link is pivotably connected to the framework at a second pivot point separate from the second connection point.

12. A system for loading a cutting tool into a machine tool, the system comprising:

a machine tool;

a tool storage structure configured to hold a plurality of tools;

a tool changer configured to move the tool back and forth between the tool storage structure and the machine tool, the tool changer including:

a framework;

a plurality of links pivotably interconnected at a plurality of connection points, the plurality of links further being pivotably connected to the framework by at least two pivot points, the plurality of links including a tool transfer link having a tool holder configured to hold the tool; and an actuator connected to the plurality of links to input motion to the plurality of links, wherein the plurality of links and framework are structurally interconnected so the actuator will move the tool holder between the tool storage structure and the machine tool in a single motion;

wherein the plurality of links includes:

a first link;

the tool transfer link pivotably connected to the first link at a first connection point;

a third link pivotably connected to the tool transfer link at a second connection point, the first link being pivotably connected to the framework at a first pivot point separate from the first connection point, the third link being pivotably connected to the framework at a second pivot point separate from the second connection point; and further wherein the plurality of links includes an actuator link connected to the actuator, the actuator link being connected to the first link by a connector link.

13. The system of claim 12 for loading a tool into a machine tool, wherein the third link is an extensible link.

14. The system of claim 12 for loading a tool into a machine tool, wherein the actuator comprises a fluid pressure cylinder.

15. An apparatus for moving an object through space along a spatially complex path, comprising:

a rigid framework;

a first link pivotably connected to the framework at a first connection point;

a second link pivotably connected to the first link at a second connection point, the second link including an object holder configured to hold the object;

a third link pivotably connected to the second link at a third connection point disposed intermediate the second connection point and the object holder, the third link being pivotably connected to the framework at a fourth connection point the third link also being an extensible link; and an actuator assembly connected to the first link to pivot the first link about the first connection point, wherein pivoting the first link about the first connection point moves the object holder along the spatially complex path.

16. A method for moving an object between a storage structure storing a plurality of objects and a machine, comprising the steps of:

moving an object holder into proximity with the storage structure;

grasping an object with the object holder, the object being disposed in the storage structure;

moving the object holder in a single movement along a complex curvilinear path and into proximity with the machine;

connecting the object holder to a plurality of interconnected links; and pivotably mounting the plurality of interconnected links to a framework at three or more connection points.

17. The method of claim 16, wherein the step of moving the object holder along a complex curvilinear path is accomplished by pivoting a single select link of the plurality of interconnected links.

18. The method of claim 16, further comprising the steps of:

connecting the object holder to an object transfer link;

pivotably connecting the object transfer link to a first link at a first connection point;

pivotably connecting the object transfer link to a third link at a second connection point disposed intermediate the object holder and the first connection point; and pivotably mounting at least one of the links to a framework.

19. The method of claim 18, wherein the step of pivotably mounting at least one of the links to a framework includes the step of pivotably mounting the first link and the third link to the framework at first and second pivot points, respectively.

20. The method of claim 19, further comprising the step of adjusting the length of one of the links.

* * * * *